March 11, 1941.    G. NEUMANN    2,234,573

SOUND INTENSITY RECORDER

Original Filed Sept. 28, 1935

Inventor:
GEORG NEUMANN

Patented Mar. 11, 1941

2,234,573

UNITED STATES PATENT OFFICE 2,234,573

SOUND INTENSITY RECORDER

Georg Neumann, Berlin, Germany

Original application September 28, 1935, Serial No. 42,658, now Patent No. 2,178,641, dated November 7, 1939. Divided and this application March 7, 1939, Serial No. 260,297. In Germany March 29, 1935

1 Claim. (Cl. 179—1)

This invention relates to a method and apparatus for the electrical measurement and recording of sound intensities.

In my Patent Number 2,178,641, dated November 7, 1939, of which the present application is a divison, I have described a recording measuring instrument which is especially adapted for the recording of sound intensities and in which the sound intensity is transformed into an electrical output. The electrical output is fed to a potentiometer which is continuously adjusted, by means of an electrical relay or coupling, under control of the potentiometer voltage, so that a constant voltage is produced at the secondary terminals of the potentiometer. The position of the potentiometer is then recorded as a measure of the arriving electric input. Thus it is possible to measure the objective values of any sound intensities.

My present invention has for its object to provide means for measuring and recording the subjective values of sound intensities.

With this and other objects in view, as may become apparent from the within disclosures, the invention consists not only in the embodiments herein pointed out and illustrated by the drawing, but includes further embodiments coming within the scope of what hereinafter may be claimed.

The character of the invention, however, may be best understood by reference to certain of its practical forms, as illustrated by the accompanying drawing in which—

Similar reference numerals denote similar parts in the different views.

Figure 1:
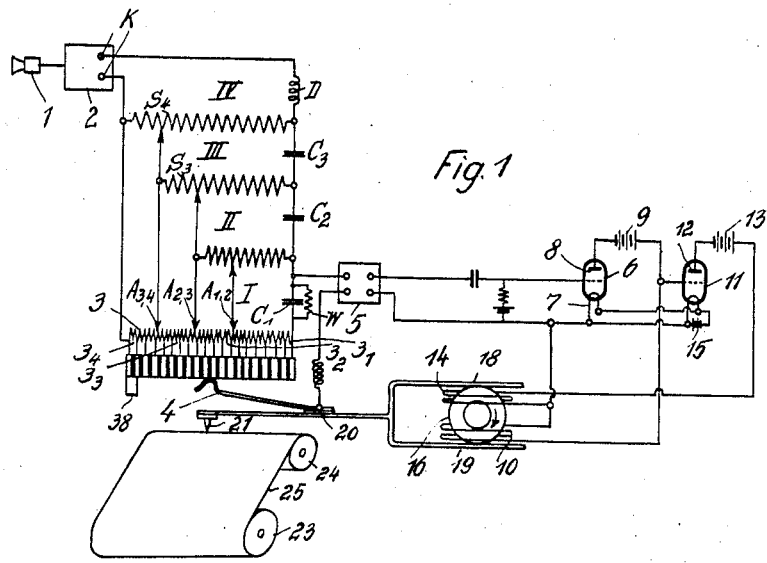
Fig. 1 is a diagrammatic view showing a sound recording apparatus having the invention applied thereto.
Figure 1A:
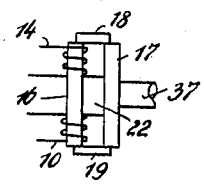
Fig. 1a is a detail of Fig. 1, viewed at right angles thereto.

Referring now to the drawing in greater detail, and first to Fig. 1, a microphone I is exposed to the sound the intensity of which is to be recorded, and, together with the associated amplifier 2, makes up means for transforming sound into electrical output. A potentiometer 3 the resistance values of which along its length is preferably provided to grow in accordance with a logarithmic curve, receives its input current from said sound transforming means, through the filter means I, II, III, IV which will be described later, and is provided with a sliding contact or movable member 4. One end of the potentiometer 3 and the sliding contact 4 are connected to the input terminals of a second amplifier 5, the output terminals of which are connected to the grid 6 and the cathode 7 of the electron valve 8 acting as an audion valve, by means of the condensers and resistances necessary for the audion circuit. In the anode circuit of the valve 8 there is inserted, in series to the anode battery 9, a winding 10 forming part of the magnetic coupling. One terminal of the winding 10 is connected to the cathode 7 of the audion 8, while the other terminal thereof is connected to the grid 11 of a second electron valve, in the anode circuit of which the second winding 14 of the magnetic coupling is inserted in series with an anode battery 13. The cathodes of the two valves 8 and 12 are connected in parallel in the usual manner and are fed from the heating battery 15. The magnetic coupling consists of two discs 16 and 17 (see Fig. 1a) which are driven in the direction of the arrow, (Fig. 1) and are made of a suitable magnetisable or magnetic material, against the top and bottom edge of which the legs 18 and 19, also consisting of a mangetic or magnetisable material, of a fork 20 carrying the sliding contact 4 and a pen 21, lie with a slight resilient friction. The coils 10 and 14 are stationarily arranged around the top and bottom part of the disc 16, in such a manner that the disc is free to rotate within the stationary coils 10 and 14. The discs 16 and 17 together with their axial connection 22 and the legs 18 and 19 of the fork 20 form two closed magnetic circuits for the fluxes generated by the coils 10 and 14. The friction of one of the said legs on the rotating discs can be increased by energising the coils in the manner which will be described whilst that of the other leg is decreased, so that the fork is moved by the rotating discs to the right or left according to the energisation of the coils. For the sake of clearness the driving arrangement for the discs 16 and 17 is not shown. A pen or stylus 21 mounted on the fork 20 draws a curve on a paper strip or the like running over the rollers 23 and 24, which curve represents the sound intensity values received by the microphone. The driving arrangement for the paper strip is not shown, for the sake of clearness.

The operation of the said sound recording device is as follows:

If no sound acts on the microphone I, the sliding contact 4 and the pen 21 may for instance be in their left hand end position, so that the input terminals of the amplifier 5 are in connection with the end terminals of the potentiometer. In this working condition the maximum anode current flows in the anode circuit of the valve 8, which energises the coil 10 and consequently magnetises that part of the disc 16 which happens to be the bottom part at the time. The potential drop obtaining in the coil 10 is impressed as a negative grid bias on the valve 12, so that the anode circuit of the valve and consequently also the excitation coil 14 is dead. By reason of this the rotary discs 16 and 17 of the magnetic coupling, which are magnetised in their bottom parts only, tend to impart a movement to the fork 20 in a left hand direction, while the fork cannot carry out this movement as the sliding contact 4 and the pen 21 as mentioned above, are already in their left hand end position, defined by a stop or the like, as indicated at 38.

Now if a sound of a definite intensity impinges on the microphone and consequently generates currents in the microphone and thus a potential on the potentiometer, the grid 6 becomes charged through the sliding contact 4 and the amplifier 5, which causes the anode current of the valve 8 to drop, whereby the excitation of the coil 10 is weakened and the potential of the grid of the second valve 12 altered, so that now a current is produced in the anode circuit of this valve, which energises the coil 14 and thereby magnetises the top part of the discs 16 and 17. Since the magnetisation of the lower disc parts is thus decreased and that of the top parts increased, a push in the right hand direction is exerted on the fork 20 which lasts for so long until, by reason of the action hereafter described, the magnetisations created by the coils 10 and 14 balance each other in their effect on the legs 18 and 19. By reason of the push to the right exerted on the fork 20 the sliding contact 4 and the pen 21 are pulled to the right together with the fork. By this movement the contact 4 taps off a gradually dropping potential on the potentiometer 3, so that the biasing potential on the grid 6 changes again in the opposite sense, and consequently the anode current flowing through the coil 10 rises again. But at the same time the bias potential of the grid 11 is also changed again. Consequently the anode current of the second valve 12 and with it the energising current of the coil 14 is again weakened, and these changes continue until the currents flowing in the coils 10 and 14 balance each other in their actions on the fork 20, and the sliding contact 4 and the pen 21 assume their positions corresponding to the sound intensity, around which they execute only small pendulous movements as long as the sound intensity remains unaltered. If the sound volume acting on the microphone decreases again, the anode current in the anode circuit of the valve 8 rises so that the excitation of the coil 10 is strengthened. Simultaneously the anode current of the valve 12 drops and with it the energising current of the coil 14 and a push towards the left is exerted on the fork so that it is re-adjusted to the left, together with the sliding contact 4 and the pen 21, into the position corresponding to the sound intensity now prevailing which position will coincide with the left end position if a predetermined minimum or zero sound volume acts upon the microphone.

Each time the sliding contact 4 and the pen 21 are in positions corresponding to the sound volume received at the time, the forces exerted by the coils 10 and 14 on the fork 20 neutralise each other. With a symmetrical design of the magnetic coupling and its energizing coils, this will be the case, when the same amount of current flows in both coils. When the number of turns of the coils are different, the equilibrium is obtained at that current proportion which gives the same number of ampere turns. It is evident that in each position of equilibrium of the fork 20 the currents in the anode circuits of the valves 8 and 12 have a definite relative intensity, and as the grid bias potential of the valve 12 is controlled only from the anode current circuit of the valve 8, this proportion between the anode currents only occurs at one definite value of the biassing potential of the grid 6, that is to say at one definite value of the input potential of the amplifier 5 tapped off by the sliding contact 4.

It is therefore evident that the sliding contact 4 always takes up such a position that the input potential of the amplifier 5 and the current and potential proportions of the further circuit elements have the same values in a balanced condition.

It will be understood that, if the terminals K of the amplifier 2 would be directly galvanically connected to the terminals of the potentiometer, the objective sound intensity values would be recorded. Now, filter elements or circuits I, II, III are provided between the amplifier and the potentiometer, in order to record the relative sound intensities as actually heard by human persons, this sound intensity being usually referred to as the "subjective sound intensity." As is well known the subjective intensity of sound varies from the objective sound intensity in a manner depending from the frequency and the intensity of the sound. The correct representation of this dependency can be deducted from the Kingsbury curves (compare for instance the "Handbuch der Experimentalphysik vol 17, Technische Akustik, part 1, 1934, page 134 and following) or from the curves of Fletcher and Munson, (comp. Applied Acoustics by Olson and Massa, Philadelphia, 1934, page 376).

The recording instrument shown in Fig. 1 is adapted for measuring electrically subjective volumes of sound instead of objective volume of sound by the fact that the potentiometer is provided with taps and that the tappings of the individual potentiometer sections are connected with the sound transforming means through filters I, II, III, IV which reduce the input fed to the potentiometer compared to the output of the transforming means, by amounts varying in accordance with the intensities and frequencies of the sound and corresponding to the differences between the objective and subjective values of sound intensity at said different sound intensities and frequencies.

The logarithmic potentiometer 3 subdivided by means of tappings $A_{1,2}$, $A_{2,3}$, $A_{3,4}$ into sections $3_1$, $3_2$, $3_3$, $3_4$, and these sections are provided with filters I, II, III, IV which allow certain definite acoustic frequencies to pass or are provided with resistances depending on the frequency, through which the input is fed to the sections. The circuits comprise capacities, ohmic resistances, potential dividers and or inductances in suitable combinations and are so calculated that the characteristic of the recording instrument corresponds to the above mentioned curves, so that it records the subjective instead of the objective volume of sound. By means of providing a sufficiently great number of tappings and filters this desideratum can be attained to any desired degree of accuracy.

The Kingsbury curves deviate the more from the horizontal line, the smaller the objective volume of the sound is. They have a downward bulging shape, which shows a minimum in a field of 1000–4000 Hertz and rises again towards the limits of the acoustic frequency range. Consequently the filters must be so chosen that they filter the very high and the very low acoustic frequencies but little, while the frequencies lying in the field of from 1000–4000 Hertz are filtered more strongly, this result being attainable by correct dimensioning of the component parts of the filter, as will be readily understood by one skilled in the art.

In Fig. 1, the section $3_4$ corresponds to the highest sound intensities, for which the characteristic is practically a straight horizontal line. Consequently the section $3_4$ is connected to the terminals K through a potential divider S. The section $3_3$ corresponds to a range of sound volume for which the characteristic forms a curve which is but slightly bent downwards. Consequently the potential divider $S_3$, which together with a part of the potential divider $S_4$ connects the section $3_3$ with the terminals K is fed through a condenser $C_3$. By these means the result is attained that the potential reaching the section $3_3$ depends on the frequency, and is the smaller the lower the frequency.

For the section $3_2$ which corresponds to still lower sound volumes, a still more pronounced drop of the characteristic is attained by the fact that it is supplied with a potential from a potential divider $S_2$, which in its turn is connected through a condenser $C_2$ with the potential divider $S_3$ which is already supplied with a potential varying in the same manner with the frequency.

Finally the section $3_1$ is connected through a condenser $C_1$ to a part of the potential divider $S_2$ and consequently has the most strongly declining characteristic.

Where it is intended to consider also the rising parts of the Kingsbury curves in the highest frequency fields, inductance means may be inserted in series to the condensers $C_1$, $C_2$, $C_3$ and such an inductance is shown at D.

The shape of the characteristics obtained can be modified in any desired manner by the provision of ohmic resistances associated to individual condensers or choking coils. Such a parallel resistance W is shown in conjunction with the condenser $C_1$.

Figure 2:
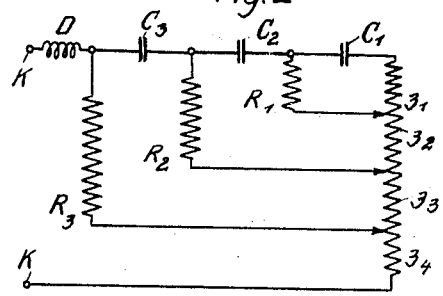
Fig. 2 is a modification of the potentiometer feeding circuit of Fig. 1.

Optionally, the potential dividers can be interconnected by condensers or choking coils in some suitable manner other than that shown in Fig. 1. For example, in place of potential dividers, resistances $R_1$, $R_2$, $R_3$ may be used through which one of the ends of each section is connected with its condenser, whilst the other end thereof is supplied with a potential through the adjacent section, such an arrangement being shown in Fig. 2. Moreover, it is possible to connect the choking coils or condensers in parallel to sections of the potential dividers or resistances.

I am aware that many further changes may be made and numerous details of construction may be varied through a wide range without departing from the principles of this invention, and I, therefore, do not purpose limiting the patent granted hereon otherwise than is necessitated by the prior art.

I claim:

In an apparatus for recording the subjective values of sound intensities, a potentiometer connected to the terminals of a sound transforming means of such apparatus and including a plurality of individual sections receiving their input from said transforming means, and corresponding to various ranges of sound intensities, a plurality of potential dividers electrically connecting said sections to said terminals, at least one of said sections being connected through one of said dividers and a part of another, a condenser in circuit with the former of said dividers, and an inductance in series with said condenser and connected to one of said terminals.

GEORG NEUMANN.